United States Patent

Dunn

[15] 3,648,444

[45] Mar. 14, 1972

[54] DRIVE UNIT FOR RECIPROCATING ELEMENT

[72] Inventor: Thomas J. Dunn, P.O. Box 110, Hackettstown, N.J. 07840

[22] Filed: July 22, 1970

[21] Appl. No.: 57,243

[52] U.S. Cl. .................................................56/296, 74/60
[51] Int. Cl. ..............................................A01d 55/02
[58] Field of Search ...................56/298, 300, 296; 74/60

[56] References Cited

UNITED STATES PATENTS

| 3,463,018 | 8/1969 | Hale et al. | 56/296 X |
| 2,824,416 | 2/1958 | Orelind | 56/296 |
| 2,835,133 | 5/1958 | Rogers et al. | 56/296 X |
| 3,561,203 | 2/1971 | Hurlburt | 56/296 |
| 3,104,511 | 9/1963 | Clark | 56/296 |

Primary Examiner—Louis G. Mancene
Assistant Examiner—J. N. Eskovitz
Attorney—Robert G. McMorrow

[57] ABSTRACT

A drive unit for an element to be reciprocated converts a rotary energy source to reciprocating movement through a wobble box having a driven shaft attached to the power source. The wobble box is maintained by stub shafts in a crank assembly, the crank assembly having slant walls permitting movement of the box upon rotation of the driven shaft. The crank assembly carries a crank shaft fixedly secured to a lever.

3 Claims, 5 Drawing Figures

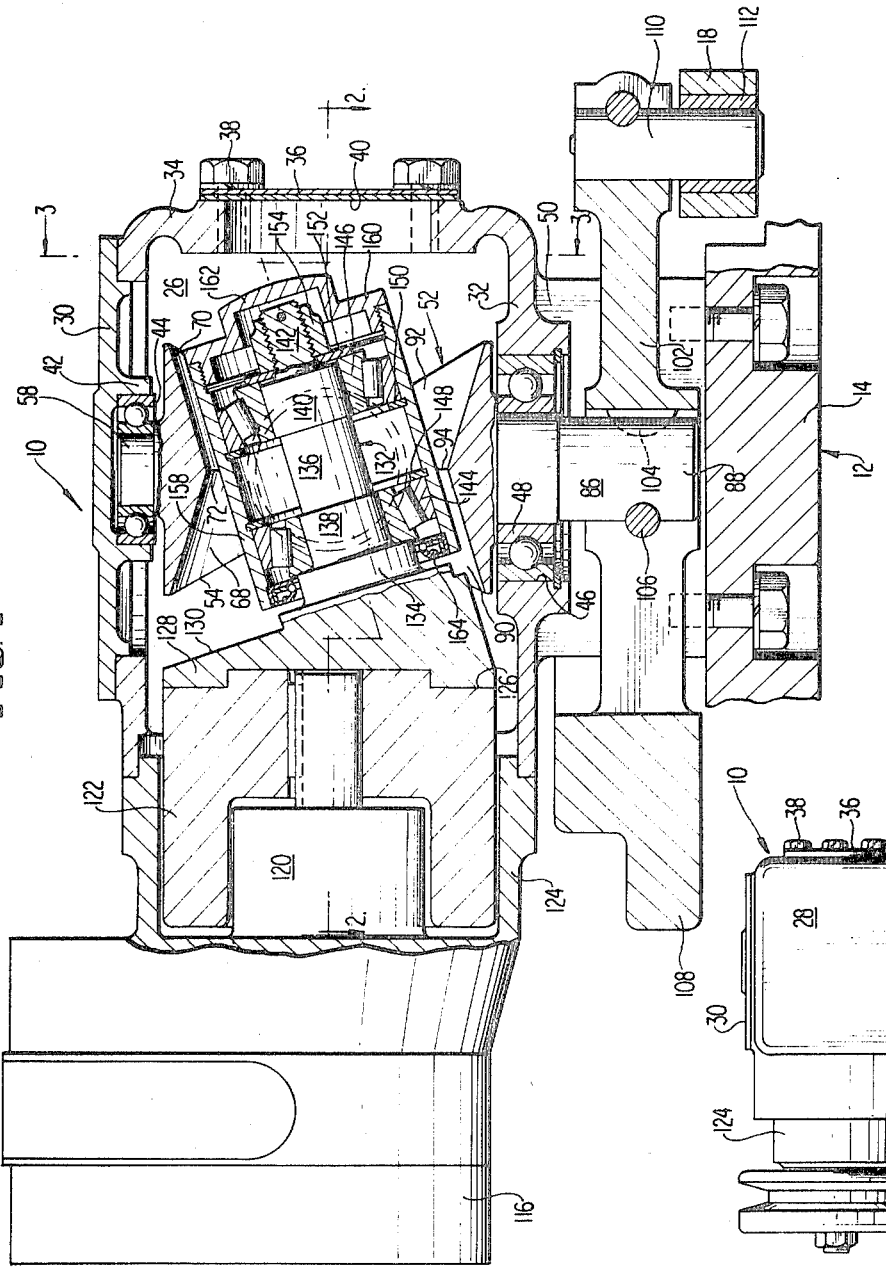

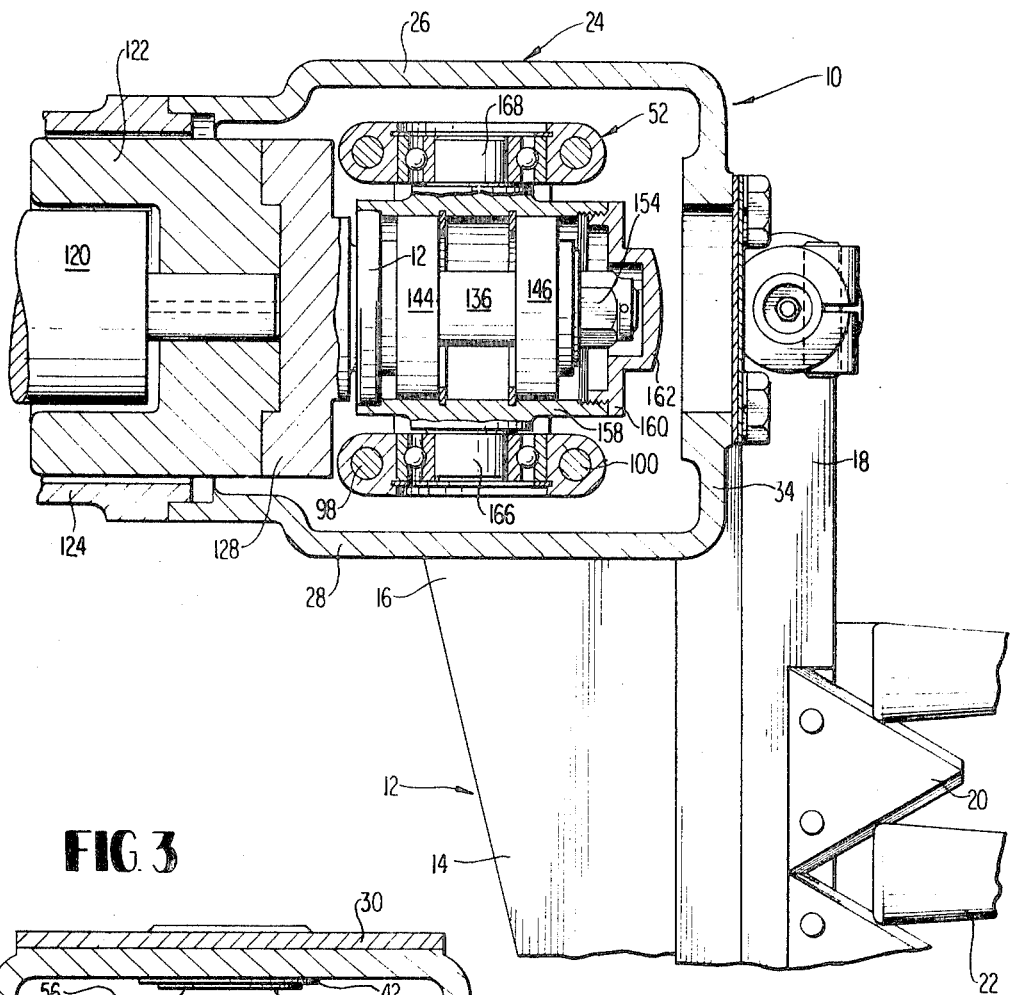
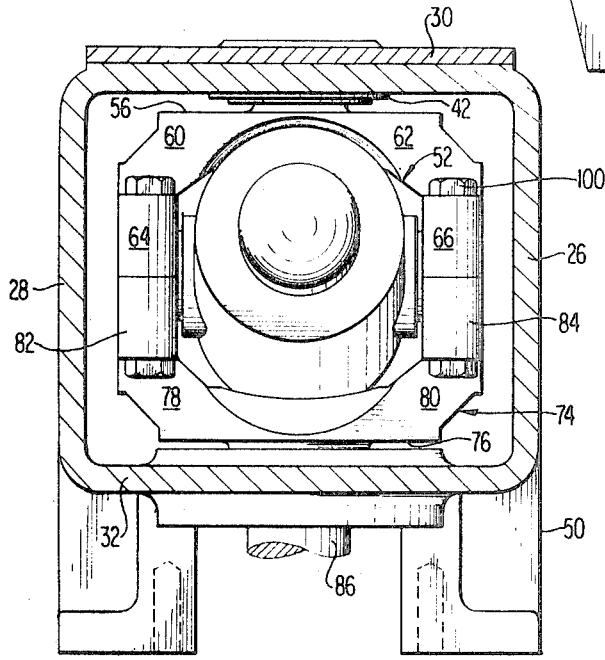

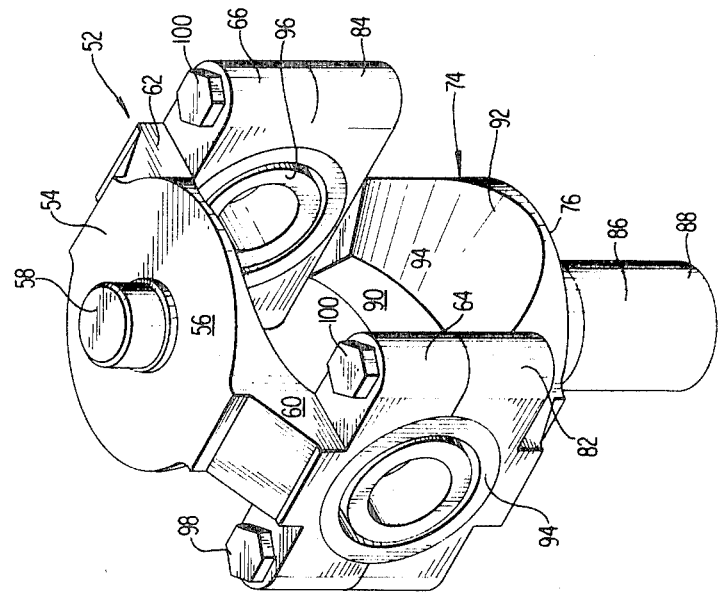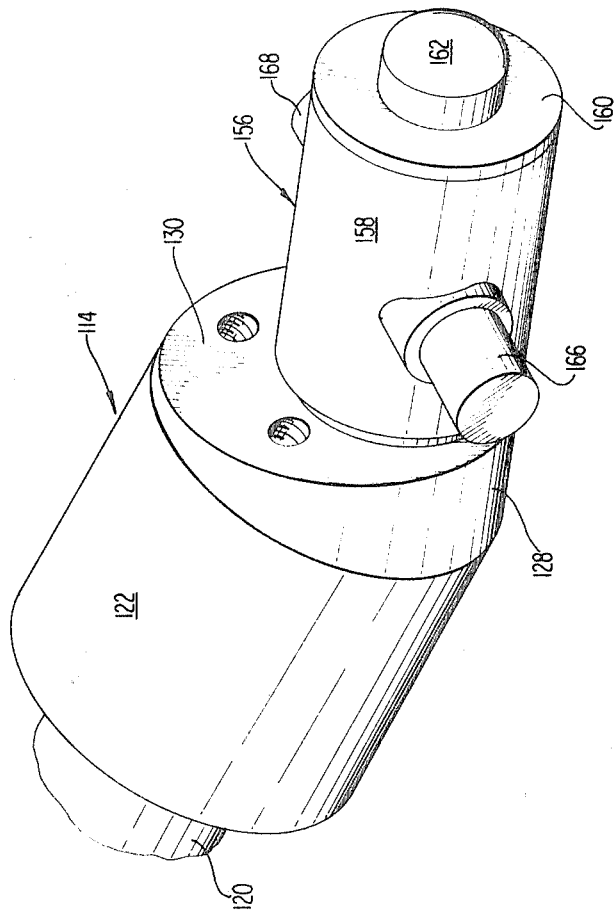
FIG 4

3,648,444

DRIVE UNIT FOR RECIPROCATING ELEMENT

BACKGROUND OF THE INVENTION

1. Field of the Invention

This invention pertains to mechanical movements for the conversion of rotary force to reciprocating force. In an environment of use wherein the unit is known to have practical application, it is incorporated in mowing apparatus of the sickle bar variety.

2. Statement of the Prior Art

Various drive units converting rotational force to reciprocating movement have been heretofore proposed. Among these are those employed in mowing apparatus which may be characterized as involving yoke and spindle combinations. Such combinations are representatively shown in prior U.S. Pats. to Clark, No. 3,104,511; Tuft, No. 3,180,073 and Orelind, No. 2,824,416.

SUMMARY OF THE INVENTION

The present invention provides a novel means for conversion of rotary force to reciprocating force which avoids the employment of complex gear mechanisms, and which avoids the difficulties in maintenance and short life span encountered in the use of yoke and spindle devices. This invention comprehends a drive unit in which a rotary input source is operatively associated with a driven shaft within a non-rotary wobble box. The wobble box is held against rotation on side shafts in a crank assembly, but is permitted to pivot fore and aft on the side shafts and also to impart alternate twisting motion to the crank assembly. The latter includes a crank shaft fixed to a lever arm which is pivotal from side to side by this alternate twisting of the crank shaft. The unit presents minimal problems in lubrication, and is readily assembled and disassembled.

The objectives of the invention further include the provision of a unit as aforesaid which is compact in design, and one which lends itself to mounting at any selected location relative to the element to be reciprocated. Still another objective is to provide a unit which operates with equal effectiveness without regard to the direction of rotation of the input force.

The unit herein supplied provides substantially true linear reciprocation, and does so with a minimum of vibration.

Other and further objects and advantages of the invention will become apparent to those skilled in the art from a consideration of the following specification when read in conjunction with the annexed drawings.

BRIEF DESCRIPTION OF THE DRAWINGS

FIG. 1 is a medial cross section taken through a drive unit constructed and assembled in accordance with the teachings of this invention;

FIG. 1A is an elevational view of a modified form of the unit of FIG. 1 on reduced scale;

FIG. 2 is a sectional view on line 2—2 of FIG. 1, looking in the direction of the arrows;

FIG. 3 discloses the interior components of the unit from the approximate plane of line 3—3 of FIG. 1; and FIG. 4 is an enlarged, disassembled perspective view of the unit.

DESCRIPTION OF THE PREFERRED EMBODIMENT

Referring to the drawings in more detail, the drive unit hereof is generally identified therein by reference numeral 10, and is shown in the environment of a reciprocating mower 12 of the sickle bar variety. In FIG. 2, it will be observed that the mower includes an elongated mower bar 14 having an inboard end portion 16, and carrying a slide bar 18. On the bar 18 are a series of blades 20 for reciprocation in slots of forwardly projecting teeth 22. The cutter bar, slides and teeth are conventional, and of optional form, per se, and are described only by way of orientation herein of the drive unit.

A basic and important element of the drive unit 10 of this invention is the housing 24 having side walls 26, 28, a removable top wall 30, and a base 32. The housing further includes a front wall 34 with an access cover 36 mounted thereon by changeable fasteners 38 and sealed against the entry of dust by a gasket 40. Top wall 30 has an inner, depending annular flange 42 which houses a bearing 44. The base 32 has a central opening 46 with a flange, coaxial with flange 42, and bearing 48 is disposed therein. The housing is supported in upwardly spaced relation to the cutter bar 14, for example, by a bracket 50 including cylindrical supports secured by fasteners 51.

Disposed within the housing and extending in part therefrom is a crank assembly 52. The assembly 52 includes a top member 54 having an upper wall 56 from which projects a stub axle 58. The axle 58 is engaged in the bearing 44 for pivotal movement with respect to top wall 30. The top member further includes side arms 60, 62, which connect with side clamp halves 64, 66, respectively. It is to be noted that the top member has interior slant walls, comprising a first slant wall 68 and a second slant wall 70 meeting at a central apex 72, functioning as described hereinafter. Similarly, the crank assembly includes a bottom member 74 having a base wall 76, and connecting walls 78, 80 with clamp halves 82, 84, respectively. An elongated crank shaft 86 of cylindrical form depends from the base wall 76 to the bearing 48 of the housing base 32 and has a distal end 88 disposed adjacent the cutter bar 14. The bottom member includes a first slant wall 90 and a second slant wall 92, the two walls meeting at a central apex 94. The first wall 90 is substantially parallel in inclination at equivalent points with the second wall 70, while the wall 92 is thus related to the wall 68.

Referring to FIG. 4, as there shown, the upper and lower members 52 and 74 of the crank assembly are joined together about coaxial side bearings 94 and 96 by bolts 98, 100.

The distal end 88 of the shaft 86 is locked to a lever arm 102 by a key 104 and pin 106. The arm has a counter balance 108 at one end and carries a depending knife drive pin 110 at its other end. The knife drive pin is engaged in a sleeve 112 of slide bar 18 so that oscillation of the lever 102 causes reciprocation of the bar 18.

The oscillation of the lever is imparted through the alternative twisting of the crank assembly 52. Such twisting is accomplished by a drive assembly identified in FIG. 4 by reference numeral 114. The assembly may be powered directly by a hydraulic motor 116 as shown in FIG. 1 in outline form, or by a belt drive to a pulley 118 as illustrated in FIG. 1A. The manner for imparting rotation to the drive assembly is therefore seen to be optional. In the hydraulically actuated form of the assembly, the mechanism includes rotary shaft 120, with an enlarged fly wheel 122 keyed thereto within a suitable housing 124 (not used in the directly driven version of FIG. 1A). The fly wheel and shaft have inner faces 126 to which is connected a wobble shaft 128 with an outer, angularly related connecting face 130. Drive shaft 132 comprising an enlarged face 134 fixed to the face 130, a reduced central portion 136, inner and outer sections 138, 140 and a threaded tip 142 is provided. Bearings 144 and 146 are retained about the portions 138 and 140 by retaining rings 148 and 150, and by a bearing adjustment washer 152 maintained by a nut 154 on the threaded tip 142.

A wobble box 156 having an outer cover 160 with a boss 162 to accommodate the nut 154, and having interior slots receiving the retaining rings 148 and 150 is provided. An inner oil seal 164 closes the inward side of the box, but it is to be noted that the drive shaft 132 is free to rotate within the box and the bearings 144, 146. Projecting from diametrically opposite sides of the box are fixed lateral stub shafts 166, 168. These are engaged, respectively, in the main bearings 94 and 96 of the crank assembly.

The manner of operation of the invention is believed to have been made apparent in the foregoing description of its structure. As the driven shaft 132 is rotated within the wobble box 156, the latter is moved in a path causing the crank assembly 52 to be oscillated from side to side, and thus causing oscillation of the shaft 86 and movement of the lever arm and slide bar.

I claim:

1. A drive unit for a reciprocating mower of the sickle bar variety, the mower having a mower bar with an inboard end, a slide carrying a series of mower blades for reciprocation relative to a series of teeth, the drive unit comprising;

a housing mounted on the inboard end of the mower bar, the housing including a top wall and base, and the base being spaced upwardly from the mower bar;

a crank assembly having a top member with a stub axle pivotally secured to the top wall of the housing, having side members, and having first and second inward slant walls;

the crank assembly further including a bottom member with an elongated crank shaft depending therefrom through said bearing in said bottom wall of the housing;

the bottom member having first and second inside slant walls arranged opposite the slant walls of the top member whereby the slant walls define oppositely inclined surfaces, the first slant wall of the top member being parallel to the second slant wall of the bottom member, and the first slant wall of the top member being parallel to the second slant wall of the bottom member;

bearings engaged between the top and bottom members of the crank assembly at the opposite sides thereof;

the crank shaft being fixedly secured to a counter balanced lever arm with one end pivotally connected to the slide whereby oscillating motion of the lever arm imparted by the twisting of the crank shaft imparts reciprocating movement to the slide;

a drive assembly including a rotary shaft engaged with a power source, the rotary shaft having an enlarged head portion;

the drive assembly further including a wobble shaft secured to the head and having an angularly connecting face;

a wobble box, comprising a tubular enclosure with a bearing mounted driven shaft therein, the driven shaft being fixed to the connecting face of the wobble shaft, and the wobble box being engaged between the top and bottom members of the crank assembly in contact with the slant walls thereof; and the wobble box having lateral stub shafts projecting from diametrically opposite sides thereof and engaged in the bearings between the top and bottom members whereby the tubular enclosure is restrained from rotation with the driven shaft.

2. A drive unit for a reciprocating mower including a mowing bar carrying a reciprocating mower mechanism, said drive unit comprising:

a housing having spaced walls mounted on the mower bar, a crank assembly including a stub axle pivotably engaged in one of said housing walls and further including a crank shaft extending through another of said housing walls and in axial alignment with said stub axle, spaced internal, opposed walls within said crank assembly and being slanted in opposite directions from a center line passing through the axis of said stub axle and said crank shaft with slant wall portions of one wall diametrically opposite slant wall portions of said other wall being parallel to each other, means fixedly securing said crank shaft to a lever arm with one end pivotally connected to the mower mechanism, whereby, oscillating motion of the lever arm imparted by twisting of the crank shaft imparts reciprocating movement to said power mechanism, a drive assembly including a rotary input shaft and a wobble shaft operatively secured thereto, a wobble box comprising a tubular enclosure with a driven shaft, means coupling said driven shaft to said wobble shaft at an angle to the axis of said wobble shaft, said wobble box being engaged within said crank assembly and in contact with the slanted walls of the same, said wobble box having lateral stub shafts projecting from diametrically opposite sides thereof and pivotably engaging the crank assembly at right angles to the axis of said stub shaft and said crank shaft, whereby the tubular enclosure is restrained from rotation with the driven shaft.

3. The drive unit as claimed in claim 2, wherein said crank assembly includes top and bottom members carrying respectively said stub axle and said crank shaft, and being separated by bearings with the stub shafts of said wobble box projecting in opposite directions therefrom and engaged in said bearings.

\* \* \* \* \*